US008929425B2

(12) United States Patent
Chen

(10) Patent No.: US 8,929,425 B2
(45) Date of Patent: Jan. 6, 2015

(54) MODBUS REPEATER WITH SELF-ADAPTIVE BAUD RATE AND SELF-ADAPTIVE BAUD RATE SYSTEM AND METHOD

(75) Inventor: Lei Chen, Shanghai (CN)

(73) Assignee: Schneider Electric Industries SAS, Rueil-Malmaison (FR)

( * ) Notice: Subject to any disclaimer, the term of this patent is extended or adjusted under 35 U.S.C. 154(b) by 67 days.

(21) Appl. No.: 13/884,877

(22) PCT Filed: Nov. 11, 2011

(86) PCT No.: PCT/CN2011/082092
§ 371 (c)(1),
(2), (4) Date: Jun. 20, 2013

(87) PCT Pub. No.: WO2012/062219
PCT Pub. Date: May 18, 2012

(65) Prior Publication Data
US 2013/0259095 A1    Oct. 3, 2013

(30) Foreign Application Priority Data

Nov. 12, 2010   (CN) .......................... 2010 1 0541710

(51) Int. Cl.
*H04B 3/46*   (2006.01)
*H04B 3/36*   (2006.01)
*G06F 13/38*  (2006.01)

(52) U.S. Cl.
CPC . *H04B 3/36* (2013.01); *G06F 13/38* (2013.01)
USPC ........... 375/225; 375/224; 375/316; 375/219; 375/296

(58) Field of Classification Search
USPC ..................... 375/225, 224, 316, 219, 296
See application file for complete search history.

(56) References Cited

U.S. PATENT DOCUMENTS

| 7,340,023 B1 | 3/2008 | Yearsley et al. |
| 2003/0202572 A1 | 10/2003 | Giddens et al. |

FOREIGN PATENT DOCUMENTS

| CN | 101399635 | 4/2009 |
| CN | 101551786 | 10/2009 |
| CN | 101626288 | 1/2010 |

OTHER PUBLICATIONS

International Search Report for International Application No. PCT/CN2011/082092—Date of Completion of Search: Nov. 28, 2011, 4 pages.
English Language Machine Translation of Chinese Patent Publication No. CN101399635—19 pages.
International Preliminary Report on Patentability for Int. App. No. PCT/CN2011/082092—Date of Issuance of this report: May 14, 2013—7 pages.

*Primary Examiner* — Zewdu Kassa
(74) *Attorney, Agent, or Firm* — Locke Lord LLP

(57) ABSTRACT

Disclosed are a self-adaptive baud rate system and method. The method includes: a) receiving first data and second data; b) judging whether or not a falling edge of a start bit in a synchronization code of the first data and second data is detected; c) if the falling edge is not detected, then return to step b); and if the falling edge is detected, then a first counting is started from a rising edge after the start bit based on a reference clock, and stopped at the next falling edge, and a first count value is obtained; and a second counting is started from the falling edge where the first counting was stopped, and stopped at the next rising edge, and a second count value is obtained; and d) acquiring a baud rate according to the relationships among the first count value and the second count value and a first threshold. By way of using a CPLD to detect the baud rate and encoding format of a Modbus data frame remotely according to the present application, there is no need to manually set the baud rate and encoding format locally. The function of remote auto-detection of the baud rate and encoding format can be achieved by the present application, and the materials and assembly costs of the rotary encoder are omitted.

17 Claims, 4 Drawing Sheets

MODBUS REPEATER WITH SELF-ADAPTIVE BAUD RATE AND SELF-ADAPTIVE BAUD RATE SYSTEM AND METHOD

TECHNICAL FIELD

The present invention relates to a self-adaptive baud rate system and method and a Modbus repeater, and more particularly, realtes to an implementation of a Modbus repeater with self-adaptive baud rate.

BACKGROUND ART

Modbus is a field bus standard first proposed by an American company MODICON. The existing Modbus repeater manually sets baud rate and encoding mode of Modbus communications using a rotary encoder, which cannot meet the remote control requirements of customers, cannot achieve the function of remote automatic detection, and the manual operation is inconvenient.

In view of the above problems existing in the prior art, the present invention is proposed.

SUMMARY OF THE INVENTION

Part of additional aspects and advantages of the present invention will be set forth in the following description, and part of them can be seen obviously from the description or can be obtained in the practice of the present invention.

The present schemed solution uses a Complex Programmable Logic Device (CPLD) and an external crystal oscillator to control the relay of Modbus communications, can automatically detect baud rate and encoding format of a Modbus data frame, and has characteristics of good flexibility, good extensibility, and high stability.

The technical scope of the present invention is: Modbus communications.

The applicable scope of the present invention is: being adapted to relay and isolation of Modbus communication signals.

The present schemed solution is a CPLD implementation method of a Modbus repeater. The method increases the isolation property of Modbus communications. The present scheme uses the CPLD programmable device to detect baud rate and encoding format of a Modbus data frame, and controls an enable signal of a RS485 transceiver by adjusting parameters of a baud rate generator and a counter.

The present invention discloses a self-adaptive baud rate method, comprising the steps of: a) receiving first data and second data; b) determining whether or not a falling edge of a start bit in a synchronization code of the first data and second data is detected; c) if the falling edge is not detected, returning to step b); if the falling edge is detected, starting a first counting from a rising edge following the start bit based on a reference clock, stopping the first counting at a next falling edge, and obtaining a first count value; starting a second counting from the falling edge where the first counting was stopped, and stopping the second counting at a next rising edge, and obtaining a second count value; and d) obtaining a baud rate according to the relation between the first and the second count values and a first threshold.

The present invention also discloses a self-adaptive baud rate system, comprising: a first digital filter configured to receive first data from a first transceiver; a second digital filter configured to receive second data from a second transceiver; a frequency divider configured to output a reference clock to a counter 1 and a counter 2 according to an external crystal oscillator; the counter 1 configured to count the first data and the second data based on the reference clock, and obtain a first count value and a second count value; a baud rate detection unit configured to receive the first data and the second data from the first digital filter and the second digital filter, when detecting a falling edge of a start bit in a synchronization code of the first data and the second data, control the counter 1 to start a first counting from a rising edge following the start bit and stop the first counting at a next falling edge and obtain the first count value, control the counter 1 to start a second counting from the falling edge where the first counting was stopped until a next rising edge and obtain the second count value, and obtain a baud rate according to the relation between the first and the second count value and a first threshold; a counter 2 configured to perform a third counting to the first data and the second data based on the reference clock, and obtain a third count value; a baud rate generator configured to control an output control unit and the counter 2 according to the baud rate detected by the baud rate detection unit and the encoding mode together with the first data and second data; the output control unit configured to output a first enable signal and a second enable signal under the control of the counter 2 and the baud rate generator.

The present invention also provides a self-adaptive baud rate Modbus repeater, comprising the self-adaptive baud rate system described above.

The present invention uses CPLD technology, because the logic operation of CPLD is achieved by hardware, which is much faster than the speed of MCU, brings a very small communication delay, and has good flexibility.

By remotely detecting baud rate and encoding format of a Modbus data frame using the CPLD according to the present invention, there is no need to manually set the baud rate and encoding format locally.

The present invention can achieve the function of remote automatic detection of the baud rate and encoding format, and save the materials and assembly costs of the rotary encoder.

BRIEF DESCRIPTION OF THE DRAWINGS

Through the detailed description of preferred embodiments of the present invention with reference to the accompanying drawings, the above and other objects, features and advantages of the present invention will become more apparent, wherein the same reference numerals denote units having the same structure, and in which.

DESCRIPTION OF THE PREFERRED EMBODIMENTS

Figure 1:
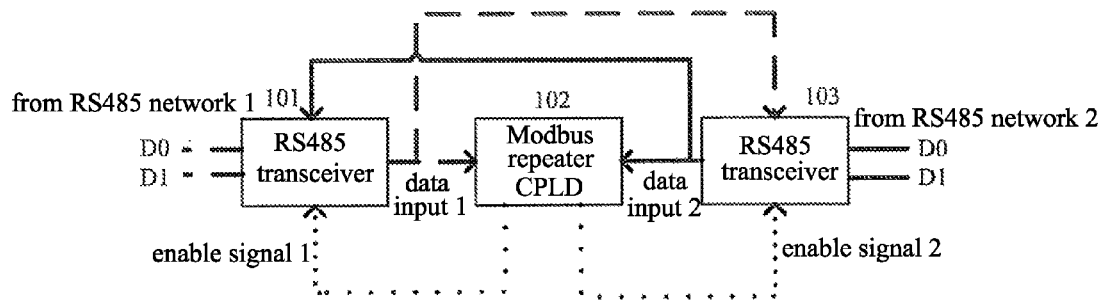
FIG. 1 schematically shows an application environment of a Modbus repeater.

Hereinafter, the present invention will be fully described with reference to the accompanying drawings showing embodiments of the present invention. However, the present invention can be implemented in various manners, and thus should not be construed to be limited to the embodiments disclosed herein. On the contrary, those embodiments are provided for the thorough and complete understanding of the present invention, and completely convey the scope of the present invention to one skilled in the art. For the sake of clarity, components in the drawings are enlarged.

As will be appreciated by one skilled in the art that, when "element" is called being "connected" or "coupled" to another element, it may be directly connected or coupled to another element or intervening elements may exist. In contrast, when the element is called being "directly connected" or "directly coupled to" another element, there are no intervening elements. The same reference numerals indicate the same elements. The term "and/or" used herein comprises any and all combinations of one or more of the associated listed items.

As will be appreciated by one skilled in the art, despite the terms first, second, third etc. may be used herein to describe various elements, components, and/or sections, these elements, components and/or sections are not limited by these terms. These terms are only used to differentiate the elements, components or sections from each other. Thus, under the premise of without departing from the teaching of the present invention, a first element, component or section discussed below may be termed a second element, component, or section.

The terms used herein are only for the purpose of describing particular embodiments, and are not intended to limit the present invention. The singular forms "a", "an" and "that (this)" used herein are intended to include the plural forms, unless the context clearly specifies that plural forms are not included otherwise. It should be appreciated that the term "comprising" when used in this specification directs to the presence of said feature, integer, step, operation, element and/or component, but does not exclude the presence or addition of one or more other features, integers, steps, operations, elements, components, and/or combinations thereof.

The present invention is characterized in adopting a synchronization frame to achieve the function of automatic detection of the baud rate and encoding format.

1: The scheme adopts an external crystal oscillator OSC as a reference clock input. The reference clock is used for counter input, and further controls automatic detection of the baud rate.

2: A Modbus master device initially sends a synchronization frame, CPLD 102 will detect its start bit and baud rate, and thereby determines output of a baud rate generator.

3: The baud rate generator controls enable signals of RS485 transceivers 101 and 103 by means of output of another counter.

The scheme is capable of enhancing features and functionalities of an existing product (Modbus repeater).

The schemed solution has a short detection time, a high efficiency, and a good stability.

VHDL or Verilog language simulation as well as gate-level simulation may be adopted.

FIG. 1 schematically shows an application environment of a Modbus repeater.

As shown in FIG. 1, data DO and DI from RS485 networks 1 and 2 are inputted to RS485 transceivers 101 and 103, respectively. Data input 1 and data input 2 are Modbus communications signals from RS485 transceivers 101 and 103. Modbus repeater 102 generates enable signal 1 and enable signal 2 according to data inputs 1 and 2 from RS485 transceivers 101 and 103, and outputs them to RS485 transceivers 101 and 103 respectively, so as to make control thereto. That is, the data inputs 1 and 2 inputted to Modbus repeater 102 are used to generate enable signals.

Meanwhile, as shown in FIG. 1, data input 1 from RS485 transceiver 101 and data input 2 from RS485 transceiver 103 also are inputted to RS485 transceivers 103 and 101 respectively, so as to provide an actual data path.

Figure 2:
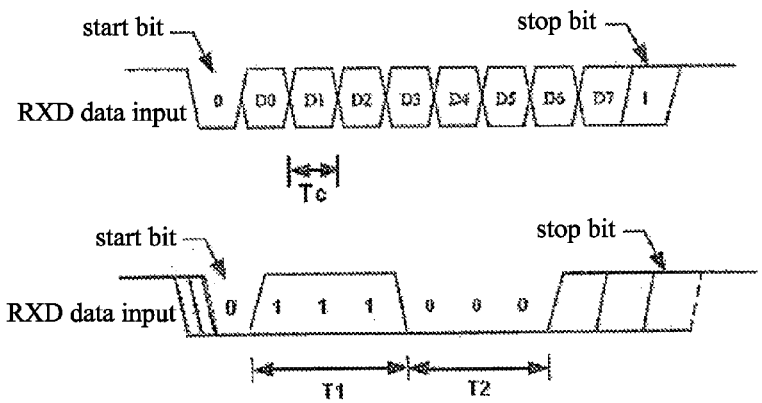
FIGS. 2 and 3 schematically show a schematic diagram of a method of extracting the code stream rate and encoding mode from a synchronization frame.
Figure 3:
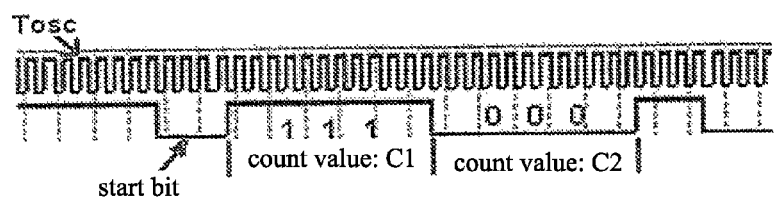

FIGS. 2 and 3 schematically show a schematic diagram of a method of extracting the code stream rate and encoding mode from a synchronization frame.

As shown in FIG. 2, Tc is the time of one bit, T1 is the time of a high level bit, and T2 is the time of a low level bit.

It may be set that T1+T2≥6 bits, so as to improve the accuracy of baud rate detection, in the present example, it is set that T1+T2=6 bits. But as will be appreciated by one skilled in the art that, T1+T2 is not limited to 6 bits shown herein.

In this text, description is provided with the detection of five encoding modes as example, while ignoring other combinations. However, as will be appreciated by one skilled in the art, according to practical requirements, the existing combinations of T1 and T2 may also be taken.

For example, as shown in Table 1, the following five possible combinations of T1 and T2 may be taken:

TABLE 1

| Circumstances | T1 + T2 = 6 bits | | Code | Encoding mode |
| | T1 | T2 | | |
| --- | --- | --- | --- | --- |
| A | 5 bits | 1 bit | 1000 001X | 10 bits: no parity bit, the stop bit is 1 bit |
| B | 4 bits | 2 bits | 1100 001X | 11 bits: no parity bit, the stop bit is 1 bit |
| C | 3 bits | 3 bits | 1110 001X | 11 bits: no parity bit, the stop bit is 2 bits |
| D | 2 bits | 4 bits | 1111 001X | 12 bits: no parity bit, the stop bit is 2 bits (non-standard Modbus format) |
| E | 1 bit | 5 bits | 1111 101X | other non-standard formats (prohibit the enable signals) |

The baud rate is determined according to the value of T1+T2, the specific method is as follows:

counting is performed with Tosc as a cycle starting from the rising edge following the start bit within the time period T1, the count value is C1;

counting is performed with Tosc as a cycle starting from the falling edge within the time period T2, the count value is C2;

wherein the value of C1+C2 has a linear relation with the value of T1+T2; the value of C1−C2 has a linear relation with the value of T1−T2; and $T_{OSC}$ is the cycle of the basic clock signal (from the crystal oscillator OSC).

A threshold value Cth can be obtained by calculating the ratio of a different baud rate of Modbus input data from the RS485 transceivers 101 and 103 to $T_{OSC}$ (the basic clock signal), Cth reflects the ratio of a different baud rate to Tosc, different baud rates correspond to different Cth values. One skilled in the art may adopt an already-known correspondence table of the baud rate and the threshold value according to the prior art. Considering that certain errors exist in practice, such ratio may be fixed in a register of the CPLD. Thus, the baud rate of data can be determined by comparing the relation between C1+C2 and Cth.

The relation between C1+C2 and Cth as shown in FIG. 3 is: C1+C2=6*Cth.

In addition, it can be seen from Table 1 that, the value of C1−C2 reflects a specific encoding mode:

C1−C2=Cenc

Cenc is a preset value to which the specific encoding mode corresponds, i.e., the last column in Table 1.

Here, the particular methods for obtaining the baud rate by the relation between C1+C2 and Cth and obtaining the specific encoding method by the relation between C1−C2 and Cenc are not the key points of the present invention, which belong to the prior art, therefore, detailed descriptions thereof are omitted here.

Figure 4:
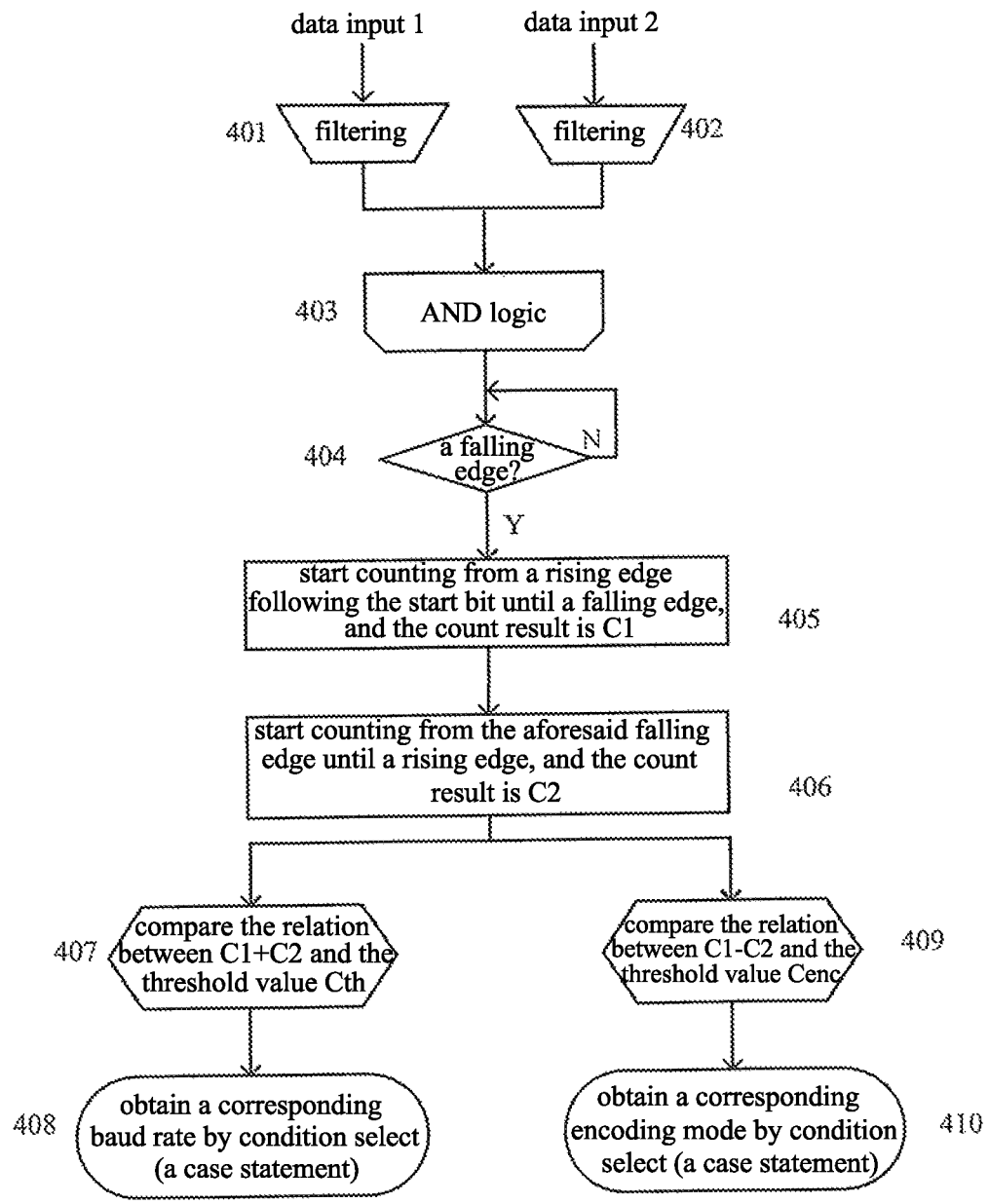
FIG. 4 shows a flowchart of a self-adaptive baud rate method according to an embodiment of the present invention.

FIG. 4 a flowchart of a self-adaptive baud rate method according to an embodiment of the present invention.

As shown in FIG. 4, in steps 401 and 402, data inputs 1 and 2 from RS485 networks 1 and 2 are filtered, respectively.

In step 403, an AND operation is performed on the filtered data inputs 1 and 2.

In step 404, whether the data outputted from step 403 is a falling edge is determined, i.e., in step 404, whether it is a falling edge of the start bit of the data synchronization code transmitted by the system is determined. If not, step 403 is continuously proceeded to conduct the determination of a falling edge. If it is determined as a falling edge, step 405 is proceeded to start a first counting from a rising edge following the start bit and stop the first counting until a next falling edge appears, and obtain a count result C1. In step 406, a second counting is started from the falling edge where the first counting was stopped, and the second counting is stopped until a next rising edge appears, and a count result C2 is obtained.

In step 407, the relation between C1+C2 and the threshold value Cth is compared. And in step 408, a corresponding baud rate is obtained by a condition select statement. It can be known with reference to the description of FIG. 3 that the baud rate value to which the relation between C1+C2 and the threshold value Cth corresponds is already known, and may be defined by a user himself/herself. The relation between C1+C2 and Cth as shown in FIG. 3 is C1+C2=6*Cth. Accordingly, steps 407 and 408 can obtain the baud rate using the prior art with reference to FIG. 3. Thus, details for their correspondence are not repeated here.

In step 409, the relation between C1−C2 and Cenc is compared. And in step 410, a corresponding encoding mode is obtained by a condition select statement. It can be known with reference to the description of FIG. 3 that the encoding mode to which the relation between C1−C2 and the threshold value Cth corresponds is already known, and may be defined by a user himself/herself. C1−C2=Cenc. Accordingly, steps 409 and 410 can obtain the encoding mode using the prior art with reference to FIG. 3. Thus, details for their correspondence are not repeated herein.

Figure 5:
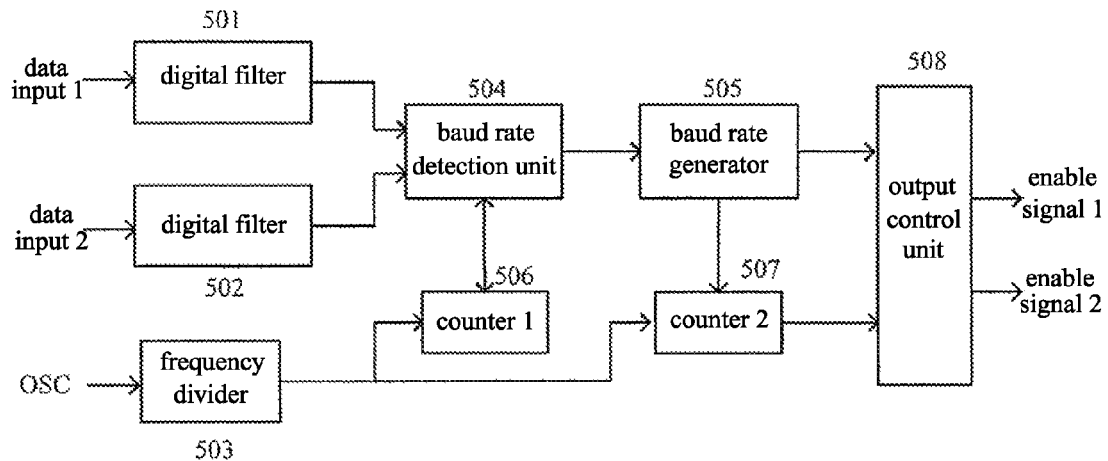
FIG. 5 schematically shows a block diagram of implementation of a self-adaptive baud rate system according to an embodiment of the present invention.

FIG. 5 schematically shows a block diagram of implementation of a self-adaptive baud rate system according to an embodiment of the present invention. The self-adaptive baud rate system according to an embodiment of the present invention corresponds to Modbus repeater 102 in FIG. 1.

As shown in FIG. 5, the self-adaptive baud rate system comprises: digital filters 501 and 502, a frequency-divider 503, a baud rate detection unit 504, a baud rate generator 505, a counter 1 506, a counter 2 507, and an output control unit 508.

First, considering that certain interferences exist in communications lines, to avoid false determination and guarantee the accuracy of the code stream rate detection, digital filtering process are performed on Modbus data input 1 from RS485 transceiver 101 and Modbus data input 2 from RS485 transceiver 103, respectively.

The digital filtering in this embodiment, for example, may perform digital sampling processing on the data inputs 1 and 2 via a basic clock signal, only when meeting the prescribed requirements (e.g., Sample1=Sample2=Sample3 . . . ), an input low level is considered as valid. Here, delay of a few basic clock signals may be introduced, but system performance will not be affected.

The digital filters 501 and 502 perform digital filtering processing on Modbus data input 1 from RS485 transceiver 101 and Modbus data input 2 from RS485 transceiver 103, respectively.

The baud rate detection unit 504 receives the filtered data 1 and data 2 from the digital filters 501 and 502. When detecting a falling edge of the start bit in the synchronization code of data 1 and data 2, the baud rate detection unit 504 controls the counter 1 506 to start counting from a rising edge following the start bit and stop the counting at a next falling edge of the data, and obtain a count value C1; and controls the counter 1 506 to start counting again from the falling edge where the aforesaid counting was stopped until a next rising edge, and obtain a count value C2; and obtains the baud rate and the encoding mode according to the relation between the count values C1 and C2 and the threshold values Cth and Cenc.

The baud rate generator 505, according to the baud rate and encoding mode detected during the self-adaptive baud rate detection process performed by the baud rate detection unit 504, begins to control the output control unit 508 to output an enable signal from the start bit of each character (i.e., the start bit of the actual data sent from the system) of the Modbus signals (data inputs 1 and 2) from the RS485 transceivers, then the counter 2 counts, and output of an enable signal of the output control unit 508 is turned off, after the count value reaches a threshold value Cth2 which corresponds to the ratio of a character time corresponding to the baud rate and encoding mode derived by the baud rate detection unit 504 to the basic clock Tosc, thereby controls the data output of the RS485 transceiver, and achieves the aim of data relay.

When it is determined that the falling edge that starts the counter 2 507 to count is from the first data, the output control unit 508 only starts the enable signal 1; when it is determined that the falling edge that starts the counter 2 507 to count is from the second data, the output control unit 508 only activates the enable signal 2. The output control unit prohibits an enable signal according to a comparison between the count value from the counter 2 507 and the threshold value Cth2.

Figure 6:
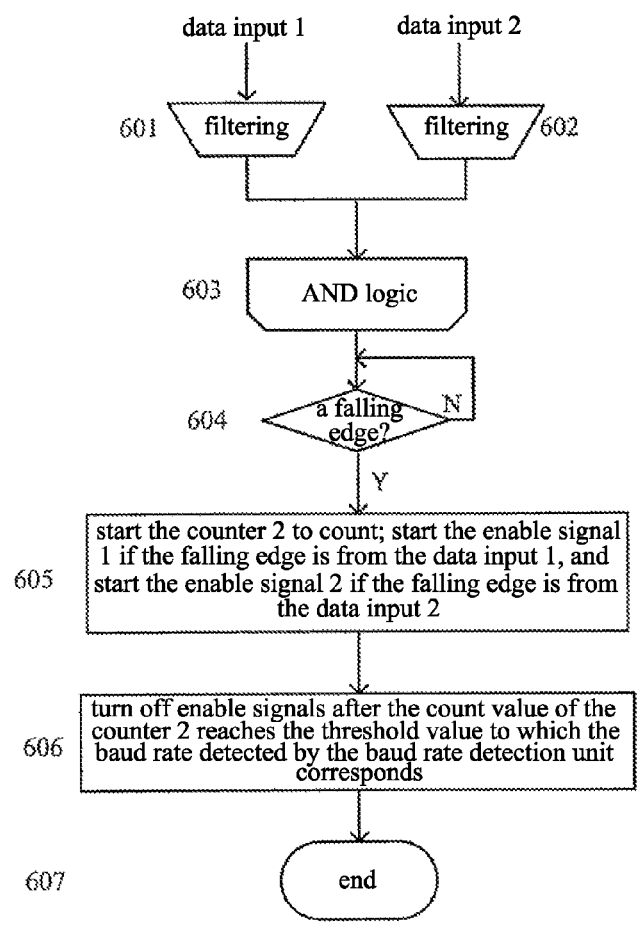
FIG. 6 shows a flowchart of working principles of a baud rate generator according to an embodiment of the present invention.

The flowchart of working principles of the baud rate generator 505, the counter 2 507, and the output control unit 508 will be provided with reference to FIG. 6.

FIG. 6 illustrates a flowchart of working principles of a baud rate generator according to an embodiment of the present invention.

As shown in FIG. 6, in steps 601 and 602, data inputs 1 and 2 from the RS485 networks 1 and 2 are filtered, respectively.

In step 603, an AND operation is performed on the filtered data inputs 1 and 2.

In step 604, whether the data outputted in step 603 is a falling edge is determined. That is, in step 604, whether it is a falling edge of the start bit of the actual data sent from the system is determined. If not, step 604 is continuously proceeded to determine a falling edge. If a falling edge is determined, step 605 is proceeded to start the counter 2 507 to count, and the enable signal 1 is activated if the falling edge is from the data input 1; the enable signal 2 is activated if the falling edge is from the data input 2.

In step 606, when the count value of the counter 2 reaches the threshold value Cth2 to which the baud rate detected by the baud rate detection unit 504 corresponds, the enable signals 1 and 2 are turned off. The ratio of a character time to which the baud rate and encoding mode derived by the baud rate detection unit 504 corresponds to the basic clock Tosc may be regarded as a threshold value Cth2. Wherein the enable signals 1 and the enable signal 2 are a mutually exclusive relationship, for controlling the data outputs of the RS485 transceivers.

Figure 7:
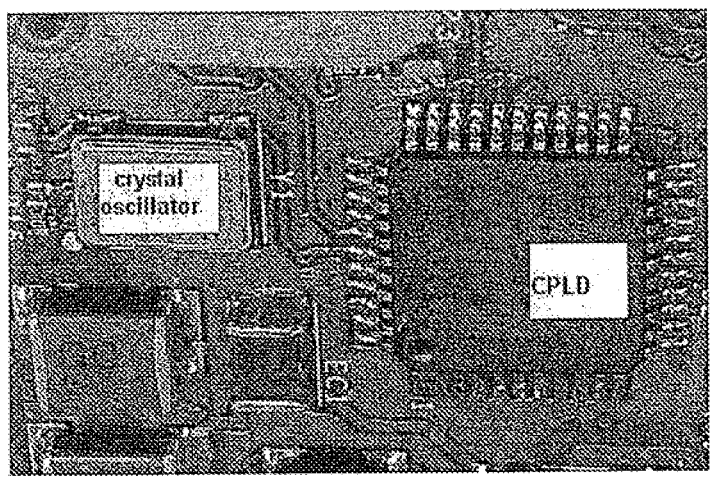
FIG. 7 schematically shows a physical diagram of implementation of a chip of a self-adaptive baud rate system (i.e., Modbus repeater) according to an embodiment of the present invention.

FIG. 7 schematically shows a physical picture of implementation of a chip of a self-adaptive baud rate system (i.e., Modbus repeater) according to an embodiment of the present invention.

The present invention uses CPLD technology, because the logic operation of CPLD is achieved by hardware, which is much faster than the speed of MCU, brings a very small communication delay, and has good flexibility.

Although the present invention is described with reference to the most practical and preferable embodiments as considered at present, as will be appreciated by one skilled in the art that the present invention is not limited to the disclosed embodiments, on the contrary, the present invention is intended to cover various modifications and equivalent structures included within the spirits and scopes of the appended claims.

The invention claimed is:

1. A self-adaptive baud rate method, comprising the steps of:
   a) receiving first data and second data;
   b) determining whether or not a falling edge of a start bit in a synchronization code of the first data and second data is detected;
   c) if the falling edge is not detected, returning to step b); if the falling edge is detected, starting a first counting from a rising edge following the start bit based on a reference clock, stopping the first counting at a next falling edge, and obtaining a first count value; starting a second counting from the falling edge where the first counting was stopped, and stopping the second counting at a next rising edge, and obtaining a second count value; and
   d) obtaining a baud rate according to the relation between the first count value and the second count value and a first threshold.

2. The self-adaptive baud rate method according to claim 1, further comprising the step of: obtaining an encoding mode according to the relation between the first count value and the second count value and a second threshold.

3. The self-adaptive baud rate method according to claim 1, wherein the baud rate is obtained by comparing the relation between a sum of the first count value and the second count value and the second threshold value according to an already-known baud rate correspondence table.

4. The self-adaptive baud rate method according to claim 3, wherein the encoding mode is obtained by comparing the relation between a difference of the first count value and the second count value and the second threshold value according to an already-known encoding mode correspondence table.

5. The self-adaptive baud rate method according to claim 4, further comprising the step of: f) determining whether a falling edge of an actual data start bit of the first data and the second data is detected; if the falling edge is not detected, returning to step f); if the falling edge is detected, starting a third counting based on the reference clock; meanwhile, outputting a first enable signal if the falling edge is from the first data, and outputting a second enable signal if the falling edge is from the second data.

6. The self-adaptive baud rate method according to claim 5, further comprising the step of: g) forbidding the first enable signal and the second enable signal, after the third count value reaches a third threshold value.

7. The self-adaptive baud rate method according to claim 6, wherein the first enable signal controls a first transceiver that receives the first data from a first network; and the second enable signal controls a second transceiver that the second data from a second network.

8. The self-adaptive baud rate method according to claim 7, wherein the first threshold value is a ratio of a different baud rate to the basic clock signal; the second threshold value is a preset value to which a different specific encoding mode corresponds; and the third threshold value is the ratio of a character time corresponding to the baud rate and encoding mode derived by the baud rate detection unit to the basic clock.

9. A self-adaptive baud rate system, comprising:
   a first digital filter configured to receive first data from a first transceiver;
   a second digital filter configured to receive second data from a second transceiver;
   a frequency divider configured to output a reference clock to a first counter and a second counter according to an external crystal oscillator;
   the first counter configured to count the first data and the second data based on the reference clock, and obtain a first count value and a second count value;
   a baud rate detection unit configured to receive the first data and the second data from the first digital filter and the second digital filter, when detecting a falling edge of a start bit in a synchronization code of the first data and the second data, control the first counter to start a first counting from a rising edge following the start bit and stop the first counting at a next falling edge and obtain the first count value; control the first counter to start a second counting from the falling edge where the first counting was stopped until a next rising edge, and obtain the second count value; and obtain a baud rate according to the relation between the first count value and the second count value and a first threshold;
   the second counter configured to perform a third counting on the first data and the second data based on the reference clock, and obtain a third count value;
   a baud rate generator configured to control an output control unit and the second counter according to the baud rate and the encoding format detected by the baud rate detection unit together with the first data and second data;
   the output control unit configured to output a first enable signal or a second enable signal under the control of the second counter and the baud rate generator.

10. The self-adaptive baud rate system according to claim 9, wherein the baud rate detection unit obtains an encoding mode according to the relation between the first count value and second count value and a second threshold.

11. The self-adaptive baud rate system according to claim 9, wherein the baud rate detection unit obtains the baud rate by comparing the relation between a sum of the first count value and the second count value and the second threshold value according to an already-known baud rate correspondence table.

12. The self-adaptive baud rate system according to claim 11, wherein the baud rate detection unit obtains the encoding mode by comparing the relation between a difference of the first count value and the second count value and the second threshold value according to an already-known encoding mode correspondence table.

13. The self-adaptive baud rate system according to claim 12, wherein the baud rate generator determines whether a falling edge of an actual data start bit of the first data and the second data is detected, controls the second counter to start a third counting when the falling edge is detected; the output control units outputs a first enable signal if it is determined that the falling edge that starts the second counter to count is from the first data; the output control units outputs a second enable signal if it is determined that the falling edge that starts the second counter to count is from the second data.

14. The self-adaptive baud rate system according to claim 13, wherein the output control unit forbids outputs of the first enable signal and the second enable signal, when the third count value from the second counter reaches a third threshold value.

15. The self-adaptive baud rate system according to claim 14, wherein the first enable signal controls a first transceiver that receives the first data from a first network; and the second enable signal controls a second transceiver that the second data from a second network.

16. The self-adaptive baud rate system according to claim 15, wherein the first threshold value is a ratio of a different baud rate to the basic clock signal; the second threshold value is a preset value to which a different specific encoding mode corresponds; and the third threshold value is the ratio of a character time corresponding to the baud rate and encoding mode derived by the baud rate detection unit to the basic clock.

17. A Modbus repeater with self-adaptive baud rate, comprising the self-adaptive baud rate system according to claim 9.

* * * * *